United States Patent
Son (10) Patent No.: US 8,180,857 B2
(45) Date of Patent: May 15, 2012

(54) METHOD FOR DOWNLOADING FILE IN PARALLEL

(75) Inventor: Sei Il Son, Seoul (KR)

(73) Assignee: CDNetworks Co., Ltd., Seoul (KR)

( * ) Notice: Subject to any disclaimer, the term of this patent is extended or adjusted under 35 U.S.C. 154(b) by 141 days.

(21) Appl. No.: 12/675,771

(22) PCT Filed: Sep. 17, 2008

(86) PCT No.: PCT/KR2008/005484
§ 371 (c)(1), (2), (4) Date: Feb. 26, 2010

(87) PCT Pub. No.: WO2009/038337
PCT Pub. Date: Mar. 26, 2009

(65) Prior Publication Data
US 2010/0257256 A1 Oct. 7, 2010

(30) Foreign Application Priority Data
Sep. 17, 2007 (KR) .................. 10-2007-0094398

(51) Int. Cl.
*G06F 15/16* (2006.01)
*H04L 12/28* (2006.01)

(52) U.S. Cl. ........ 709/219; 709/231; 709/232; 709/235; 370/400

(58) Field of Classification Search .................. 709/219, 709/231, 232, 235; 370/400
See application file for complete search history.

(56) References Cited

U.S. PATENT DOCUMENTS

| | | | |
|---|---|---|---|
| 6,857,012 B2 * | 2/2005 | Sim et al. ...................... | 709/222 |
| 7,325,068 B2 * | 1/2008 | Roberts et al. ................. | 709/232 |
| 7,945,689 B2 * | 5/2011 | Painter et al. ................. | 709/231 |
| 7,949,641 B1 * | 5/2011 | Eatough ........................ | 707/705 |
| 2004/0172476 A1 | 9/2004 | Chapweske | |
| 2007/0288484 A1 | 12/2007 | Yan et al. | |

FOREIGN PATENT DOCUMENTS

| | | |
|---|---|---|
| JP | 2004-126912 A | 4/2004 |
| KR | 10-2004-0085692 A | 10/2004 |
| WO | WO 2005/122532 A1 | 12/2005 |

OTHER PUBLICATIONS

PCT International Search Report and Written Opinion, PCT/KR2008/005484, Mar. 10, 2009, 7 pages.

* cited by examiner

*Primary Examiner* — Asghar Bilgrami
(74) *Attorney, Agent, or Firm* — Fenwick & West LLP

(57) ABSTRACT

Disclosed is the parallel download for a file, which calculates availability values of each block by using node operation rates of each node having blocks constituting a file, and preferentially downloads a block having a minimum availability value among the calculated availabilities, thereby increasing probability to access the file and each block constituting the file, thus to perform file downloading more accurately and rapidly.

8 Claims, 6 Drawing Sheets

METHOD FOR DOWNLOADING FILE IN PARALLEL

TECHNICAL FIELD

The present invention relates to a parallel download of a file, and more particularly, if a specific file is divided into a plurality of blocks and the divided blocks are separately stored in a plurality of clients (node or computer) or servers, to perform a parallel download of the blocks from the plurality of clients or servers.

BACKGROUND ART

Currently, a file transmission has been performed in various methods through an Internet as well as a variety of communication networks including a mobile communication network, and the like.

A parallel download for a file is a method, if a file to be downloaded to a client is present in servers or other clients serving as nodes connected through a communication network, which divides the file into a plurality of blocks and simultaneously requests the download of the blocks from the multiple servers or clients, thus to reduce a download time of the file.

With the reduced download time of a file along with the development of
the communication network, such parallel downloading method for a file has been widely used in a Peer To Peer (P2P), a Grid Computing and the like.

As a related art method for selecting and downloading blocks to perform the parallel downloading method for a file, a sequential selection, a random selection, a rarest first selection, and the like are mainly used.

The sequential selection method is a method for sequentially selecting blocks constituting a file and requesting the download of the blocks from nodes having the blocks.

According to the sequential selection method, if a plurality of nodes are assumed to download the same file, the number of copied blocks at an end of the file on a communication network would be smaller than that of copied blocks at a front thereof until all nodes complete the downloads. Therefore, it would be difficult to download the blocks at the end of the file.

The random selection method is a method for randomly selecting one among blocks constituting a file and requesting the download of the block from nodes having the block.

According to the random selection method, if it assumed that operation rates of all nodes downloading the same file are the same, the number of each copied block would be the same.

However, in an ad-hoc network such as the P2P network, the operation rates of the nodes are different and independent from each other. Accordingly, the random selection method is unable to assure that the copied
numbers of each block for the file being downloaded are the same.

The rarest first selection method is a method for calculating the number of each block belonging to nodes connected through a communication network for a file being downloaded, and requesting a download of a block having the smallest copied number.

The rarest first selection method has an advantage of assuring that the number of the blocks being downloaded is uniformly maintained, however, the operation rates of the nodes having the blocks are different from each other, thereby making it difficult to uniformly maintain a probability to access the nodes having each of the blocks constituting the file.

DISCLOSURE OF THE INVENTION

Therefore, it is an object of the present invention to provide a block selection method in a parallel downloading for a file, which can increase probability to access each block constituting the file regardless of a position of the file and the blocks constituting the file, a parallel downloading method for a file using the same, and a recording medium for recording a program to implement such method.

In addition, another object of the present invention is to provide a block selection method in a parallel downloading for a file, which enables the file downloading to be performed more rapidly and accurately by increasing the probability to access each block constituting the file regardless of the position of the blocks, a parallel downloading method for a file using the same, and a recording medium for recording a program to implement such method.

To achieve these objects, there is provided a parallel downloading method for a file, which downloads a file to a first node in a parallel downloading system for a file, the system composed of a plurality of nodes, comprising: obtaining information related to block availabilities of the plurality of the nodes connected to the system; and if the first node among the nodes requests to download a file, preferentially downloading, to the first node, a block having a minimum value of block availability among blocks constituting the file.

Preferably, the information related to the block availabilities includes at least one or more of information regarding which block of the file belongs to which node among the plurality of nodes; information related to node operation rates of each of the plurality of the nodes; and information related to calculated availability values of each block constituting the file and information related to a block having a minimum value of block availability.

Preferably, the availability value of the block is obtained by using the node operation rate.

Preferably, the node operation rate is calculated by [Numerical formula 1] below:

$$\text{Active}(j) = \text{a time for which a node } j \text{ actually operates/measuring duration,} \qquad \text{[Numerical formula 1]}$$

wherein the Active(j) indicates an operation rate of a node j.

Preferably, the availability value of the block is calculated by [Numerical formula 2] below:

$$\text{Avail}_{block}(f, i) = 1 - \Pi(1 - \text{Active}(j)), \ (j \in \text{Sources}(f, i)) \qquad \text{[Numerical formula 2]}$$

wherein the Sources(f, i) indicates a set of nodes having a block i of a file f, and the $\text{Avail}_{block}(f, i)$ indicates availability of the block i, which is a fragment of the file f.

Preferably, the information related to the block availability is obtained by a broker server serving as an entity of a network.

To achieve these objects, there is provided a block selection method, which selects, by a first node, blocks constituting a file to download the file in a parallel downloading system for a file, the system composed of a plurality of nodes, comprising: (a) calculating availability values of each block by using operation rates of each node having blocks constituting the file; and (b) selecting a block having a minimum availability value among the calculated availability values.

Preferably, the step (a) is performed after a file search message is transmitted to each node, and a response message including node information, information related to the node operation rates and block information of a file stored in each of the nodes is received from each of the nodes.

Preferably, the step (b) further includes: determining whether the number of the blocks having the minimum availability value among the calculated availability values exceeds one, wherein if the number of the blocks having the minimum availability value exceeds one, one of the blocks having the minimum availability value is selected.

Preferably, the selection of one of the blocks having the minimum availability value includes determining whether or not the nodes having the blocks of the minimum availability value operate, and selecting a block of an operating node.

According to another aspect of the present invention, there is provided a recording medium for recording a program to implement a parallel downloading method for a file.

According to a preferred embodiment of the present invention, there is provided a recording medium for recording a program to implement a parallel downloading method for a file, which typically implements a program of commands that can be executed by a digital processing apparatus, and which records a program that can be read by the digital processing apparatus, so as to implement a file downloading method by any nodes in a parallel downloading system for a file, the system composed of a plurality of nodes, the parallel downloading method for a file comprising: (A) calculating block availability values of each block by using operation rates of each node having blocks constituting a file; (B) selecting a block having a minimum value of block availability among the calculated block availability values; and (C) downloading the selected block from the node having the selected block.

The step (A) may be performed after a file search message is transmitted to each node, and a response message including node information, information related to the node operation rates and block information of a file stored in each of the nodes is received from each of the nodes.

In step (A), the node operation rate may be calculated by [Numerical formula 1] below:

Active($j$)=a time for which a node $j$ actually operates/ measuring duration,     [Numerical formula 1]

wherein the Active($j$) indicates an operation rate of a node $j$.

In step (a), the availability value of the block is calculated by [Numerical formula 2] below:

Avail$_{block}$($f$, $i$)=1−Π(1−Active($j$)), ($j$∈Sources ($f$, $i$)),     [Numerical formula 2]

wherein the Sources($f$, $i$) indicates a set of nodes having a block i of a file f, and the Avail$_{block}$($f$, $i$) indicates availability of the block i, which is a fragment of the file f.

The step (B) further includes: determining whether the number of the blocks having the minimum availability value among the calculated availability values exceeds one, wherein if the number of the blocks having the minimum availability value exceeds one, one of the blocks having the minimum availability value is selected.

And, the selection of one of the blocks having the minimum availability value includes determining whether or not the nodes having the blocks of the minimum availability value operate, and selecting a block of an operating node.

EFFECT

The parallel downloading method for a file according to the present invention and a recording medium for recording a program to implement such method have an effect of increasing a probability to access each block constituting a file, regardless of a position of the file and the blocks constituting the file.

In addition, file downloading may be performed more rapidly and accurately, by increasing the probability to access each block constituting the file regardless of the position of the blocks.

The present invention downloads from a block having the lower block availability by using the operation rate of the node and the file/block availability information using the same, thereby enabling the rapid downloading of a completed file.

In addition, the global file availability, i.e., the probability to access the corresponding file, is increased by preferentially downloading the blocks constituting the corresponding file.

MODES FOR CARRYING OUT THE PREFERRED EMBODIMENTS

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

For the explanation of the present invention with reference to the drawings, components performing same functions will be represented by the same reference numerals. Known technologies which are considered as obscuring the concept of the present invention and a detailed description of their configurations will be omitted.

Though terms including ordinal numbers such as a first, a second, etc. may be used to explain various components, the components are not limited to the terms. The terms are used only for the purposed of distinguishing one component from another component.

For instance, a first component may be referred to as a second component, or similarly, the second component may be referred to as the first component, without departing from the scope of the present invention.

A term 'and/or' is used to include a combination of a plurality of disclosed items or one of the items.

In case it is mentioned that a certain component is "connected" or "accessed" to another component, it may be understood that the certain component is directly connected or accessed to the another component or that a component is interposed between the components.

On the contrary, in case it is mentioned that a certain component is "directly connected" or "directly accessed" to another component, it should be understood that there is no component therebetween.

Terms used in the present invention is to merely explain specific embodiments, thus it is not meant to be limiting.

A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention.

The terms same as those of which are defined in a general dictionary should be understood that the terms have meanings same as contextual meanings of the related art. And, as long as the terms are not definitely defined in the present invention, the terms are not interpreted as ideal or excessively formal meanings.

Hereinafter, descriptions of conceptual assumptions and technical terms to explain the present invention will be given in detail.

Preferred embodiments of the present invention are based on a distributed system, which is composed of a plurality of nodes and stores files in each node in a block unit. However, the technical characteristics of the present invention are not limited to the distributed system.

In a method for performing a parallel downloading for a file according to the present invention, the parallel download is not performed in a file unit, but in a block unit under the assumption that a specific file is composed of a plurality of blocks.

Hereinafter, terms used in the present invention will be described.

1) A 'node operation rate (or node activity rate)' refers to a time for which a specific node actually operates for a certain period of time (measuring duration). The operation rate (or activity rate) of a node may be calculated by a numerical formula as shown in [Numerical formula 1].

$$\text{Active}(j) = \text{a time for which a node } j \text{ actually operates/measuring duration.} \quad \text{[Numerical formula 1]}$$

In [Numerical formula 1], the Active(j) indicates the operation rate of the node j, and the measuring duration is a preset time.

Meanwhile, each node may calculate its own operation rate. An entity of the network (so called, a broker server) may also calculate the operation rates of each node.

2) 'Availability' refers to a probability to access a file or blocks for a download in the distributed system composed of a plurality of nodes. Such availability is divided into 'file availability' and 'block availability.'

2-1) First, the 'block availability' is a probability to globally access blocks constituting a file in the distributed system. Here, the term 'global' refers to a range (scope) accessible to all nodes which are storing a corresponding block in the distributed system.

The block availability may be calculated by a numerical formula as shown in [Numerical formula 2].

$$\text{Avail}_{block}(f, i) = 1 - \Pi(1 - \text{Active}(j)), \quad (j \Pi \text{Sources}(f, i)) \quad \text{[Numerical formula 2]}$$

In [Numerical formula 2], the Sources(f, i) indicates a set of nodes having the block i of the file f. The $\text{Avail}_{block}(f, i)$ indicates availability of the block i, which is a fragment of the file f.

Since the block availability depends on the operation of the nodes capable of uploading blocks, the block availability may be calculated by using the times of the operation rates of the nodes capable of uploading the blocks.

2-2) The 'file availability' is a probability to globally access a file in the distributed system. Here, the term 'global' refers to a range (scope) accessible to all nodes which are storing a corresponding file in the distributed system.

The availability of a file composed of blocks may be calculated by a numerical formula as shown in [Numerical formula 3].

$$\text{Avail}_{file}(f) = \text{Min } \{\text{Avail}_{block}(f, k)\}, (k: \text{integer}, 0 < k < m+1) \quad \text{[Numerical formula 3]}$$

In [Numerical formula 3], the $\text{Avail}_{file}(f)$ indicates availability of the file f when the file f is divided into m blocks.

The file availability may be defined as a minimum value among availabilities of blocks constituting a file since the download of the file cannot be completed if even one block in a file being downloaded is failed to download.

3) In the present invention, a 'node' is a network entity comprehensively referring to a device storing a portion of a plurality of blocks constituting a file (composed of a plurality of blocks). The node may also be referred to as a client. For instance, the node may be implemented as a Personal Computer (PC), a wireless terminal such as a mobile phone, a Personal Digital Assistant (PDA) and the like, as well as a server which is a computing device to provide a service to another terminal.

4) In the present invention, a 'broker,' as a network entity, manages information regarding which block of a file belongs to the nodes (or clients), and also manages calculation of operation rate of each node and information about node operation rate. In addition, the broker calculates the block availability by using information about blocks occupied by the nodes and information about the operation rates of each node.

5) In the present invention, a 'file server' is a server providing a file that a user desires to download.

Hereinafter, based on the above-described technical terms, basic concepts and exemplary embodiments of the present invention will be described in detail.

The present invention conceptually relates to, (1) if a file to be downloaded is composed of multiple blocks and the multiple blocks are stored in a plurality of nodes, (2) by using information about operation rates and block availabilities of each node, (3) start downloading from a block having lower block availability, thus to enable the downloading of a file to be completed more rapidly. (4) Consequently, the file availability, i.e., the probability to access a corresponding file, is enhanced by enabling the blocks constituting the corresponding file (desired to download by the user) to be preferentially downloaded.

Reference will now be made in detail to the preferred embodiments of the present invention, examples of which are illustrated in the accompanying drawings. Wherever possible, the same reference numerals will be used throughout the drawings to refer to the same or similar parts, and detailed descriptions thereof are omitted.

Figure 1:
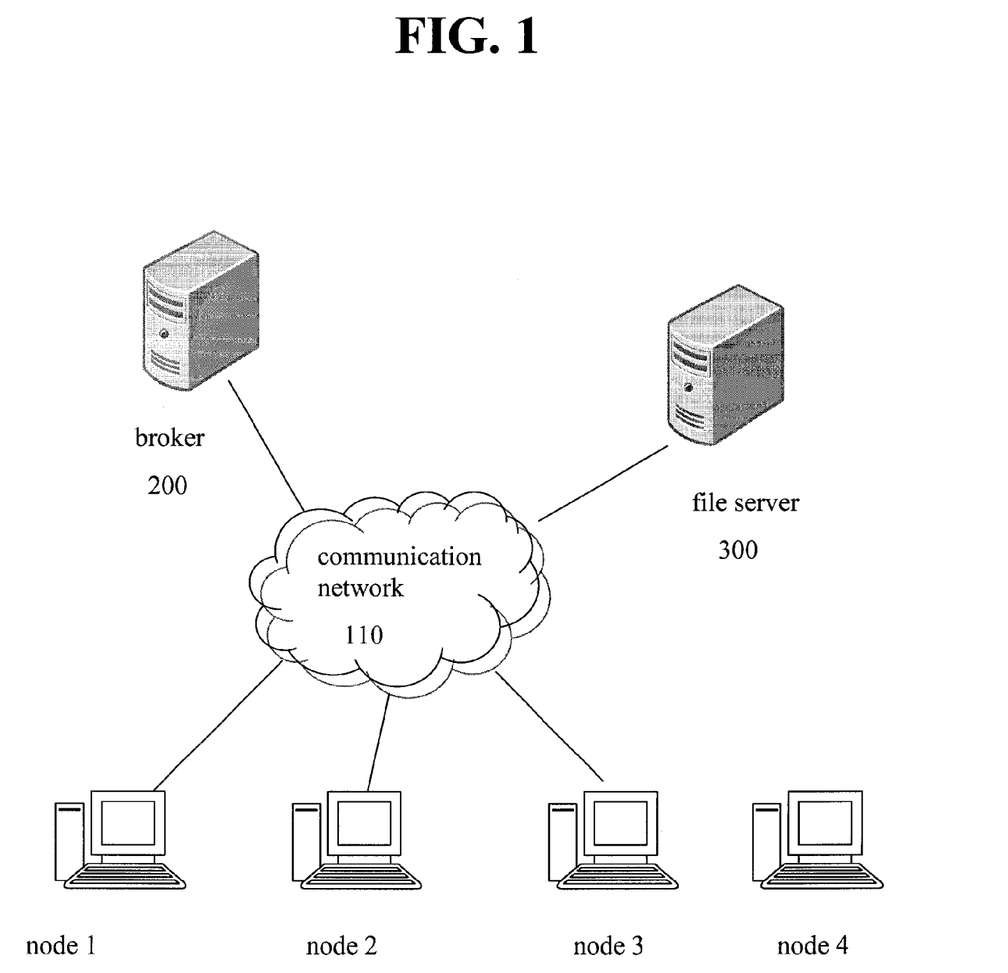
FIG. 1 is a schematic view of a parallel downloading system for a file according to one embodiment of the present invention.

FIG. 1 is a schematic view of a parallel downloading system for a file according to one embodiment of the present invention.

As shown in FIG. 1, a plurality of nodes (clients in FIG. 1), a broker (a server as a network entity) 200 and a file server 300 are connected through a communication network 110.

Functions of the components, such as the node 100, the broker 200 and the file server 300 in FIG. 1 have already been described.

The communication network 110 in FIG. 1 may include an Internet and a mobile communication network. In addition, the Internet may include the TCP/IP protocol and worldwide open system network architecture which provides a variety of services existing in an upper layer thereof, such as Hyper Text Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), and the like. In addition to a Base Station (BS), a Mobile Telephone Switching Office (MTSO) and a Home Location Register (HLR), the mobile communication network may further include components to enable the transmission/reception of wireless packet data, such as an Access Gateway (AG), a Packet Data Serving Node (PDSN), and the like.

Referring to FIG. 1, if a node 1 (a client 1), for instance, is connected to the file server 300 of the communication network to download a specific file, the broker 200 provides, to the node 1, block information of the file indicating that which nodes (clients) and/or servers (not shown) store which blocks of a plurality of blocks constituting the specific file. The broker 200 provides information related to operation rates of each node (i.e., clients 2~4). Meanwhile, the broker 200 may calculate block availability by using the operation rates of each node and provide the same to the node 1. Alternatively, the node 1 may directly calculate the block availabilities by using the block information belonging to each node and the information about the operation rates of each node provided by the broker 200. This has an effect of reducing an operational load of the network.

Description of the concept proposed in FIG. 1 will be given with reference to the signal flowchart in FIG. 2.

Figure 2:
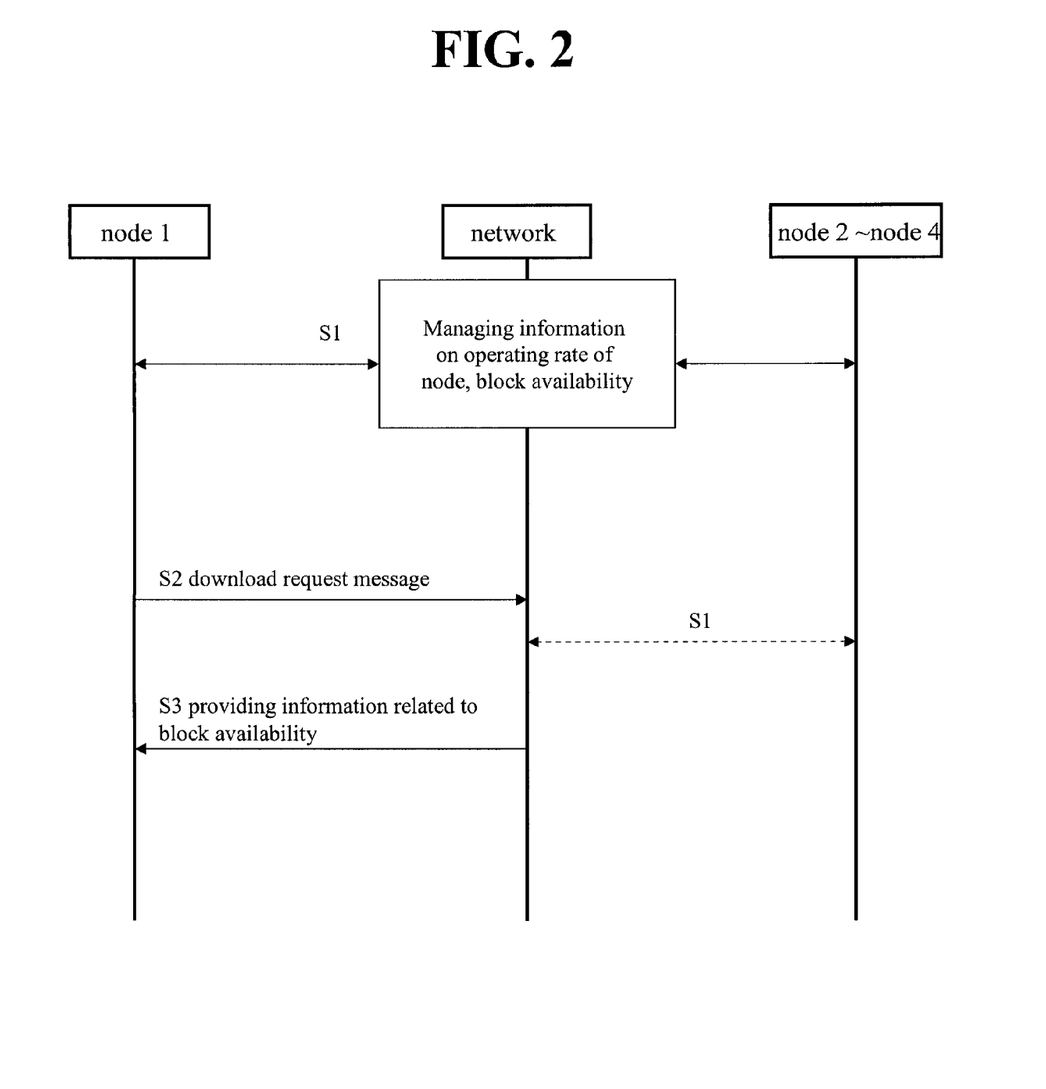
FIG. 2 is a signal flowchart illustrating a parallel download for a file according to one embodiment of the present invention.

FIG. 2 is a signal flowchart illustrating a parallel download of a file according to one embodiment of the present invention. Here, FIG. 2 shows an embodiment, if a user wants to download a specific file by connecting to a network, in which the network provides availability information of each block constituting the file and information about operation rate of a node. Here, the network is an entity comprehensively including the communication network 110, the broker 200 and the file server 300 as shown in FIG. 1.

In brief, FIG. 2 illustrates a method for downloading a file to a certain node 1 (i.e., the node 1 in FIG. 2) in the system of parallel downloading for a file composed of a plurality of nodes. In particular, from a perspective of the network, it relates to obtaining information on block availabilities of the plurality of nodes connected to the system; and, if the node 1 (i.e., the node 1 in FIG. 2) among the nodes requests a file downloading, preferentially downloading to the node 1 (i.e., the node 1 in FIG. 2) a block having the smallest block availability value among the blocks constituting the file.

Hereinafter, detailed descriptions will be given with reference to FIG. 2. The network (i.e., the broker) recognizes, through mutual communication with the nodes, that which blocks of a plurality of blocks constituting each file are stored in the nodes, and manages block information of the files belonging to each node. In addition, the network (i.e., the broker) monitors operating states of each node, as well as calculates operation rates of each node by using [Numerical formula 1] and manages information about the operation rates of each node (S1).

The node 1 sends a download request message to the network so as to download a specific file (S2). Upon receiving the download request message, the network provides information managed by the broker 200 to the node 1 (S3). The information managed by the broker 200 includes information related to which blocks of the specific file are stored in which node (for the sake of convenience, referred to as the 'first information'), and information related to the operation rate of the node (for the sake of convenience, referred to as the 'second information'). In step (S3), the network (i.e., the broker) may provide information related to 'block availability' with respect to the blocks of the file. As described above, the 'block availability' may be calculated by using [Numerical formula 2] based on the operation rates of each node. In addition, the network may provide, to the node 1, the values ranging from the smallest block availability to the greatest among the blocks belonging to the nodes, from each value of the 'block availabilities' calculated by the network (the broker). Accordingly, the network may enable the node 1 to preferentially download from a node having the block which has the smallest 'block availability.' Meanwhile, if there are two or more nodes having the block of the smallest 'block availability,' the network may instruct (command) the node 1 to connect to a node which is currently in operation among the two nodes.

Meanwhile, the step (S3) may be an optional step. Alternatively, the network may provide the first information and/or the second information to the node 1 such that the node 1 calculates block availability by using the information, and connects to a node having a corresponding block of the lowest block availability so as to download the block.

In addition, step (S1) may be performed after step (S2).

Hereinafter, descriptions of other exemplary embodiments of the present invention will be given in detail with reference to FIGS. 3 through 6. For the sake of convenience in explanation, FIGS. 3 through 6 are described from the perspective of a certain node (i.e., the node 1 in FIG. 3) desiring to download a file. However, the perspective of the network which preferentially provides (i.e., downloads) a block having a minimum value of availability to the certain node will be equally applied to the exemplary embodiments in FIGS. 3 through 6.

Figure 3:
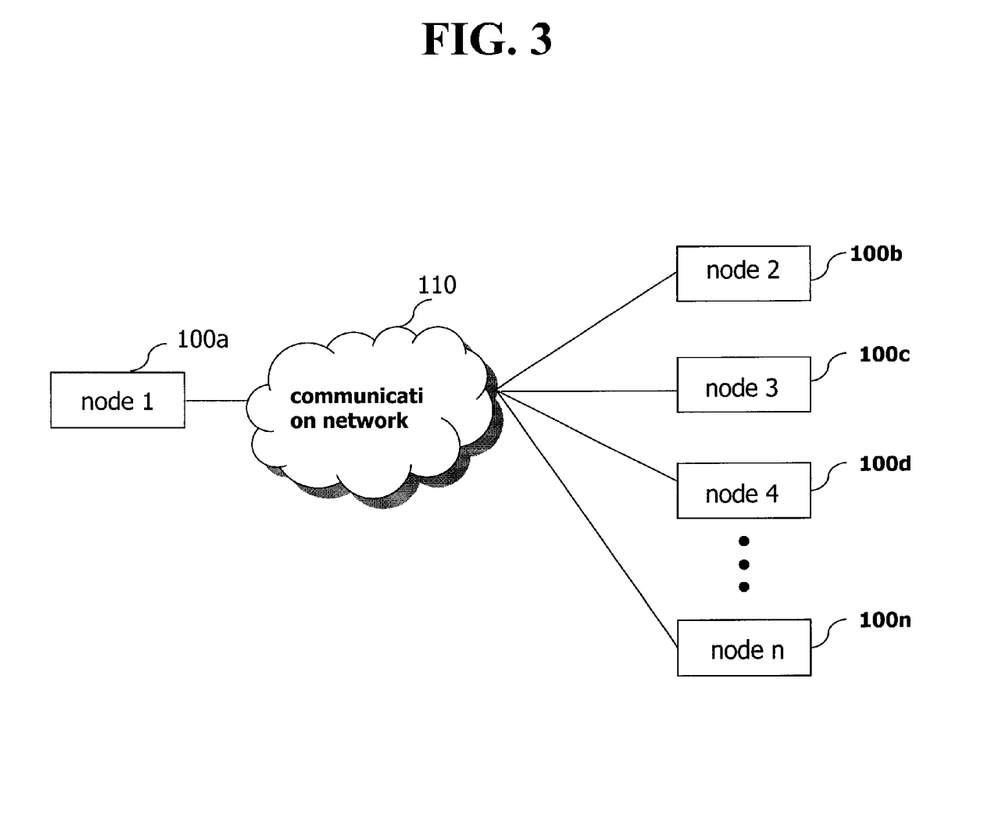
FIG. 3 is a view illustrating a parallel downloading system for a file according to one embodiment of the present invention.

FIG. 3 is a view illustrating an exemplary system of parallel downloading for a file, the system capable of performing a parallel download for a file according to one embodiment of the present invention. When compared to FIG. 1, there is a difference in that each node 100 calculates its own operation rate in the embodiment in FIG. 3.

As shown in FIG. 3, the according to a preferred embodiment of the present invention may include a plurality of nodes, such as a node 1 100a, a node 2 100b, a node 3 100c, . . . , a node n 100n, and the like.

The nodes 100 may be implemented as the computer connected to a communication network 110, and may be any type of devices as long as it can be connected to the communication network 110 by being equipped with a communication function so as to be connected to other nodes 100.

For instance, the nodes 100 may be implemented as a Personal Computer (PC), wireless terminal such as a portable terminal, a Personal Digital Assistant (PDA), etc., as well as a server as a computing device to provide a service other terminals.

Here, for the sake of convenience in explanation, it is assumed that the node 100a denotes node 1 requesting the file parallel download, and other nodes (node 2 100b, node 3 100c, . . . , node n 100n) denote nodes performing a file transmission.

Each of the nodes 100 is connected through the communication network 110. To perform the parallel download for a file according to the present invention, a parallel download for a file may be set to be performed by a block, not by the file itself in view of a processing unit.

Then, each of the nodes 100 calculates its own operation rate. The operation rate of each of the nodes 100 refers to probability in which the nodes 100 can normally transmit a file for a preset measuring duration. The operation rate of the nodes 100 may be calculated by the numerical formula such as [Numerical formula 1].

Meanwhile, the node 1 100a desiring to download a file calculates availabilities of blocks constituting the file to be downloaded. Here, the block availabilities may be calculated by the numerical formula such as [Numerical formula 2].

The availability of the file composed of the blocks may be calculated by the numerical formula such as [Numerical formula 3].

Through [Numerical formulas 1 through 3], the present invention may obtain the operation rate of each of the nodes 100, and information related to file availability and availability of blocks comprising the file. Based on the information related to the block availability, a block having a minimum value of the block availability may be recognized (checked) such that the block (i.e., the block having the minimum availability value) is preferentially downloaded from a node having the recognized block. Consequently, once the block having the minimum availability value is determined, blocks are transmitted from the nodes 100 having the block (i.e., the block having the minimum availability value), thereby facilitating the download of the corresponding file.

Description of file downloading in the parallel downloading system for a file according to the present invention will be given with reference to FIG. 3. As described above, each node 100a, 100b, 100c, . . . , 100n calculates an operation rate.

Under this state, the node 1 100a desiring to download a file transmits a file search message for the file to download to each of the nodes 100b, 100c, . . . , 100n.

A node or nodes (100b, 100c, . . . 100n) having each block associated with the file that the node 1 100a desires to download transmits, to the node 1 100a, a response message in response to the file search message by including its node information, operation rate information of the node and block information of the file stored in the node therein.

The node 1 100a calculates block availability by using the received node information, the operation rate information of the node and the block information of the file stored in the node, and downloads a corresponding block by requesting download from the node of the block having the minimum availability.

Hereinafter, descriptions of calculation of the file availability and the block availability will be given in examples shown in FIGS. 4 and 5.

Figure 4:
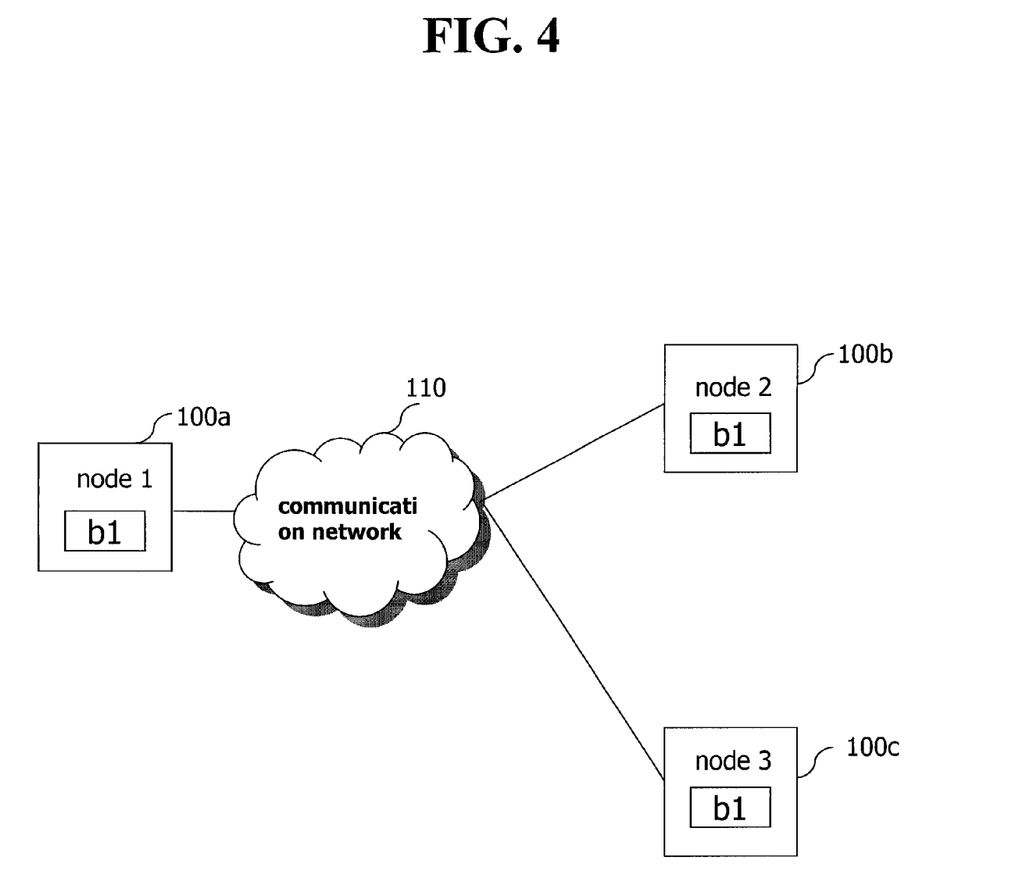
FIG. 4 is a first exemplary view of the a parallel downloading system showing one exemplary calculation of block availability and file availability to implement a block selection method according to one embodiment of the present invention.

FIG. 4 is an exemplary view of a parallel downloading system for a file showing one exemplary calculation of block availability and file availability to implement a block selection method according to one embodiment of the present invention.

In an example in FIG. 4, it is assumed that a file f is divided into two blocks of a block b1 and a block b2, and three nodes (the node 1 100a, the node 2 100b, and the node 3 100c) all store the block b1 only.

In the case of FIG. 4, a request for downloading the file f cannot be completed.

If this is to be expressed in the numerical formulas used to calculate the block availability, since there is no node having the block b2, availability of the block b2 would be $Avail_{block}$ (f, 2)=0 according to the above-mentioned [Numerical formula 2].

Therefore, availability of the file f would also be $Avail_{file}$ (f)=0 according to the above-mentioned [Numerical formula 3].

Figure 5:
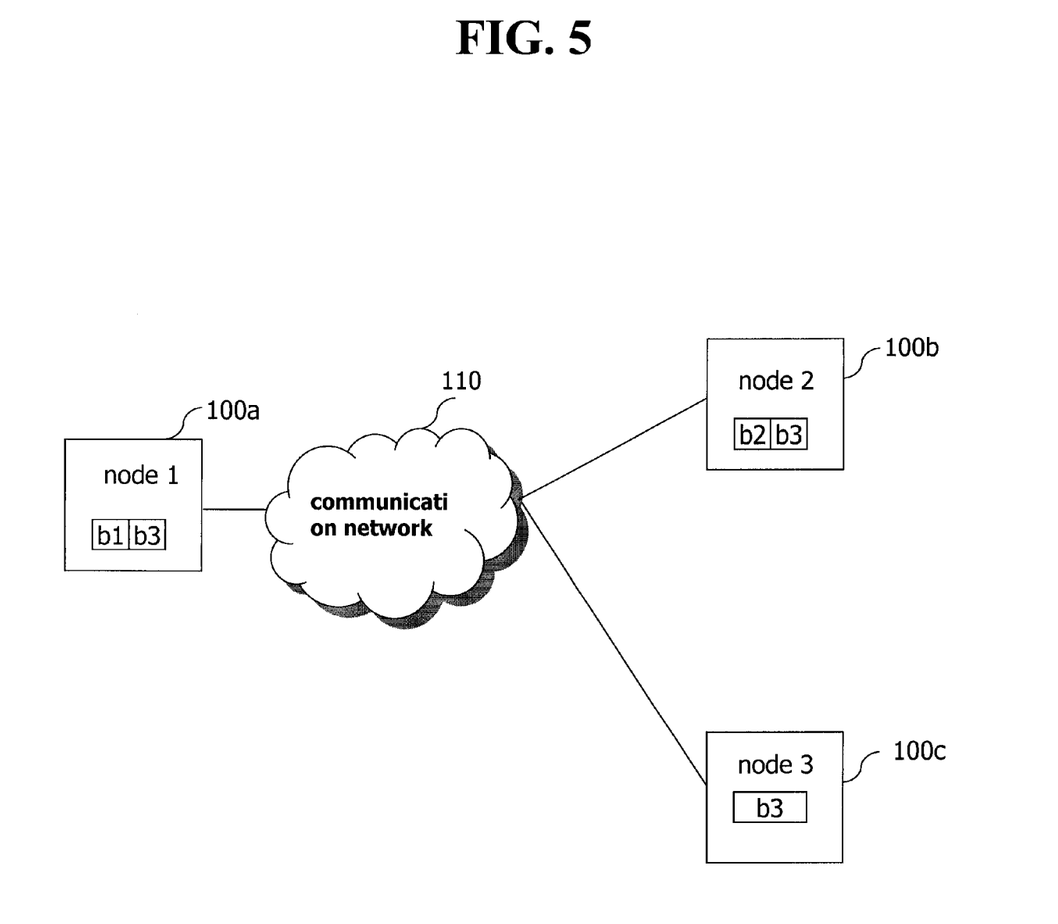
FIG. 5 is a second exemplary view of a system of parallel downloading for a file showing another exemplary calculation of block availability and file availability to implement a block selection method according to one embodiment of the present invention.

In an example in FIG. 5, it is assumed that the file f is divided into three blocks of the block b1, the block b2 and the block b3, and the node 1 100a stores the b1 and b3, the node 2 100b stores the b2 and b3, and the node 3 100c stores the b3.

The operation rates of each node are respectively assumed to be Active(node 1)=0.3, Active(node 2)=0.3, and Active (node 3)=0.4.

Here, availabilities of the blocks b1, b2 and b3 may be expressed and calculated in [Numerical formula 4] by the above-described [Numerical formula 2].

$Avail_{block}(f,b1)=1-(1-0.3)=0.3$ $Avail_{block}(f,b2)=1-(1-0.3)=0.3$ $Avail_{block}(f,b3)=1-((1-0.3)\times(1-0.3)\times(1-0.4))=0.706$  [Numerical formula 4]

Availability of the file f may be expressed and calculated in [Numerical formula 5] according to the above-described [Numerical formula 3] by using the calculated availability values of each of the blocks.

$Avail_{file}(f)=Min\ \{0.3, 0.3, 0.706\}=0.3$  [Numerical formula 5]

A file and probability to access to the file (i.e., the availability value) may be calculated from these calculation results, and the present invention may perform the parallel downloading for the file by using such availability value.

A process of performing the parallel downloading for a file through such calculation of the operation rates of each node and the file/block availability will be described with reference to FIG. 6.

Figure 6:
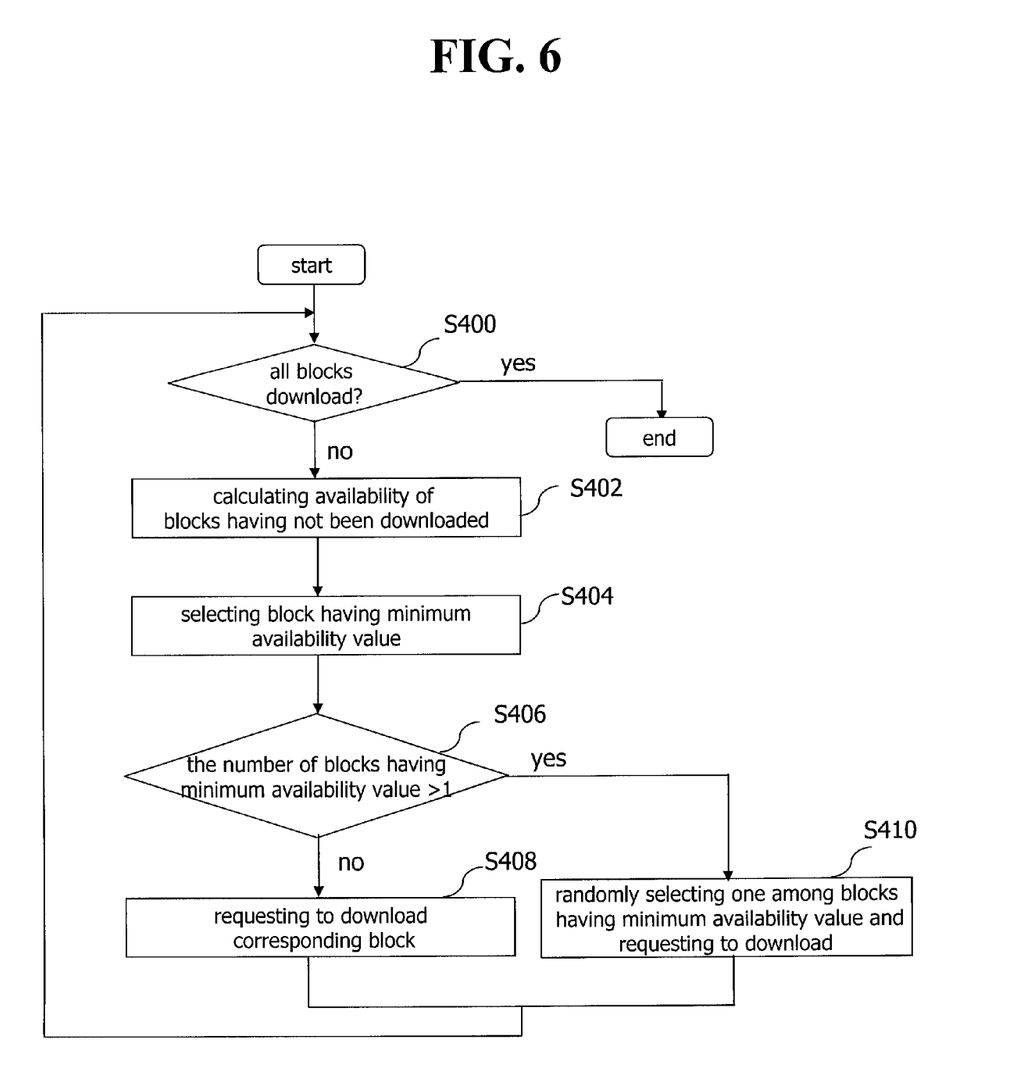
FIG. 6 is a flowchart illustrating an order in which the parallel downloading method for a file is implemented according to one embodiment of the present invention.

FIG. 6 is a flowchart illustrating an order in which a block selection method in a parallel download for a file is implemented according to one embodiment of the present invention.

As shown in FIG. 6, once the parallel download is started, it is checked whether or not all blocks of a file are received (S400).

If there are blocks having not been downloaded, block availabilities of the blocks having not been downloaded are calculated by using information related to operation rates of nodes having such blocks (S402).

A method for calculating the node operation rate and the block availability may use the above-described [Numerical formula 1] and [Numerical formula 2].

A block having a minimum availability value among the calculated block availabilities is selected (S404).

Then, it is determined whether the number of the selected blocks having the minimum availability value exceeds one (S406).

If there is one selected block having the minimum availability value, a node having the corresponding block is requested to download the selected block (S408).

Meanwhile, if there is a block having not been downloaded and a node having such block does not currently operate in the communication network, downloading the selected block should be waited until the node having the selected block operates in the communication network, and then the selected block may be downloaded when the corresponding node operates.

On the contrary, if the number of the selected blocks having the minimum availability value exceeds one or more, one of the blocks having the minimum availability value is randomly selected, and a node having the corresponding block is requested to download the selected block (S410).

Meanwhile, in randomly selecting one of the blocks having the minimum availability value, it may be determined whether or not the node having the corresponding block currently operates such that, if the node having the corresponding block operates, the block belonging to the operating node is preferentially selected to download.

The present invention calculates the operation rate of a node and the block/file availability using the same, and downloads from a block having the lower block availability, thus to rapidly perform the downloading of a complete file.

In addition, the probability to access the corresponding file, i.e., global availability of the file, may be increased by preferentially downloading the blocks constituting the corresponding file.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A computer-implemented parallel file downloading method by which a file is downloaded to a node in a parallel downloading system including a plurality of nodes, the method comprising:

obtaining node operation rates related to the plurality of the nodes connected to the system, wherein a node operation rate for a node j is calculated according to [Numerical formula 1] below:

Active(j)=a time for which a node j actually operates/a measuring duration, [Numerical formula 1]

wherein the Active(j) indicates a node operation rate of the node j;

obtaining availability values related to blocks available at the plurality of nodes based on the node operation rates, wherein an availability value of a block is calculated according to [Numerical formula 2] below:

$Avail_{block}(f, i)=1-\Pi(1-Active(j))$, (j∈Sources(f, i)), [Numerical formula 2]

wherein the Sources(f, i) indicates a set of nodes having a block i of a file f, Π is a constant and the $Avail_{block}(f, i)$ indicates availability of the block i, which is a fragment of the file f; and if the node among the plurality of nodes requests to download the file, preferentially downloading, to the node, a block having a minimum availability value among blocks constituting the file.

2. The parallel file downloading method of claim 1, further comprising:

obtaining information regarding which block of the file belongs to which node among the plurality of nodes.

3. The parallel file downloading method of claim 1, wherein the block availability values are obtained by a broker server serving as an entity of a network.

4. A block selection method in a parallel file downloading system in which a node selects blocks constituting a file to download the file, the parallel file downloading system including a plurality of nodes, the method comprising:

receiving node operation rates related to the plurality of nodes comprising blocks constituting the file, wherein a node operation rate for a node j is calculated according to [Numerical formula 1] below:

Active(j)=a time for which a node j actually operates/a measuring duration, wherein the Active(j) indicates a node operation rate of the node j; [Numerical formula 1]

calculating availability values corresponding to each of the blocks based on the node operation rates, where an availability value of a block is calculated according to [Numerical formula 2] below:

$Avail_{block}(f, i)=1-\Pi(1-Active(j))$, (j∈Sources(f, i)), [Numerical formula 2]

wherein the Sources(f, i) indicates a set of nodes having a block i of a file f, Π is a constant, and the $Avail_{block}(f, i)$ indicates availability of the block i, which is a fragment of the file f; and selecting a block having a minimum availability value.

5. The block selection method of claim 4, further comprising:

transmitting a file search message to each node;

receiving from each of the plurality of nodes a response message including node information, information related to the node operation rate, and block information of a file stored in each of the nodes.

6. The block selection method of claim 4, wherein selecting the block having the minimum availability value comprises:

responsive to a number of the blocks having the minimum availability value exceeding one block, selecting one of the blocks having the minimum availability value.

7. The block selection method of claim 6, wherein selecting one of the blocks having the minimum availability value comprises:

determining whether or not the nodes having the blocks of the minimum availability value operate; and selecting said one of the blocks at an operating node.

8. A non-transitory computer readable storage medium storing computer instructions configured to cause a processor of a computer to perform a computer-implemented parallel file downloading method by which a file is downloaded to a node in a parallel downloading system including a plurality of nodes, the method comprising:

receiving node operation rates related to the plurality of nodes comprising blocks constituting the file, wherein a node operation rate for a node j is calculated according to [Numerical formula 1] below:

Active(j)=a time for which a node j actually operates/a measuring duration, wherein the Active(j) indicates a node operation rate of the node j; [Numerical formula 1]

calculating availability values corresponding to each of the blocks based on the node operation rates, where an availability value of a block is calculated according to [Numerical formula 2] below:

$Avail_{block}(f, i)=1-\Pi(1-Active(j))$, (j∈Sources (f, i), [Numerical formula 2]

wherein the Sources(f, i) indicates a set of nodes having a block i of a file f, Π is a constant, and the $\text{Avail}_{block}(f, i)$ indicates availability of the block i, which is a fragment of the file f; and selecting a block having a minimum availability value; and downloading the selected block from the node having the selected block.

* * * * *